(12) United States Patent
Chen et al.

(10) Patent No.: US 6,987,743 B2
(45) Date of Patent: Jan. 17, 2006

(54) METHOD OF SUPPORTING SEAMLESS HAND-OFF IN A MOBILE TELECOMMUNICATIONS NETWORK

(75) Inventors: Xiaobao X Chen, Swindon (GB); Andrea Paparella, Varese (IT)

(73) Assignee: Lucent Technologies Inc., Murray Hill, NJ (US)

( * ) Notice: Subject to any disclaimer, the term of this patent is extended or adjusted under 35 U.S.C. 154(b) by 816 days.

(21) Appl. No.: 09/919,023

(22) Filed: Jul. 31, 2001

(65) Prior Publication Data

US 2002/0122412 A1 Sep. 5, 2002

(30) Foreign Application Priority Data

Aug. 21, 2000 (EP) .................................. 0020585

(51) Int. Cl.
*H04Q 7/00* (2006.01)
(52) U.S. Cl. ................... 370/328; 370/338; 370/389
(58) Field of Classification Search ............... 370/328, 370/331, 338, 352, 389, 392, 401, 475
See application file for complete search history.

(56) References Cited

U.S. PATENT DOCUMENTS

| | | | | |
|---|---|---|---|---|
| 6,473,413 B1 * | 10/2002 | Chiou et al. | ................ | 370/331 |
| 6,510,153 B1 * | 1/2003 | Inoue et al. | ................ | 370/354 |
| 6,535,493 B1 * | 3/2003 | Lee et al. | ................ | 370/329 |
| 6,571,289 B1 * | 5/2003 | Montenegro | ................ | 709/227 |
| 6,625,135 B1 * | 9/2003 | Johnson et al. | ............. | 370/332 |
| 6,654,359 B1 | 11/2003 | La Porta | ..................... | 370/328 |
| 6,822,971 B1 * | 11/2004 | Mikkonen | ................... | 370/475 |
| 2004/0024901 A1 * | 2/2004 | Agrawal et al. | ............ | 709/238 |

FOREIGN PATENT DOCUMENTS

| | | |
|---|---|---|
| EP | 1 011 241 | 6/2000 |
| WO | WO 99/31853 | 6/1999 |

OTHER PUBLICATIONS

Ramon Caceres, et al, "Fast and scalable wireless handoffs in support of mobile Internet audio", *Mobile Networks and Applications, Baltzer Science Publishers, Bussum, NL*, (vol. 3, No. 4, 1998), pp. 351-363.
Charles E. Perkins, et al, "DHCP for Mobile Networking with TCP/IP", *Proceedings IEEE International Symposium on Computers and Communications*, (Jun. 27, 1995), pp. 255-261.
European Search Report.

* cited by examiner

*Primary Examiner*—Ricky Ngo
*Assistant Examiner*—Christine Ng

(57) ABSTRACT

To deliver packets to the MAC of a roaming mobile in a seamless manner, a proxy ARP is set up, in addition to the usual ARP, and is informed of the COA and MAC address of the mobile. The proxy ARP then informs the last routing switch in the foreign network of the MAC address of the mobile.

10 Claims, 1 Drawing Sheet

METHOD OF SUPPORTING SEAMLESS HAND-OFF IN A MOBILE TELECOMMUNICATIONS NETWORK

CROSS-REFERENCE TO RELATED APPLICATION

Figure 1:
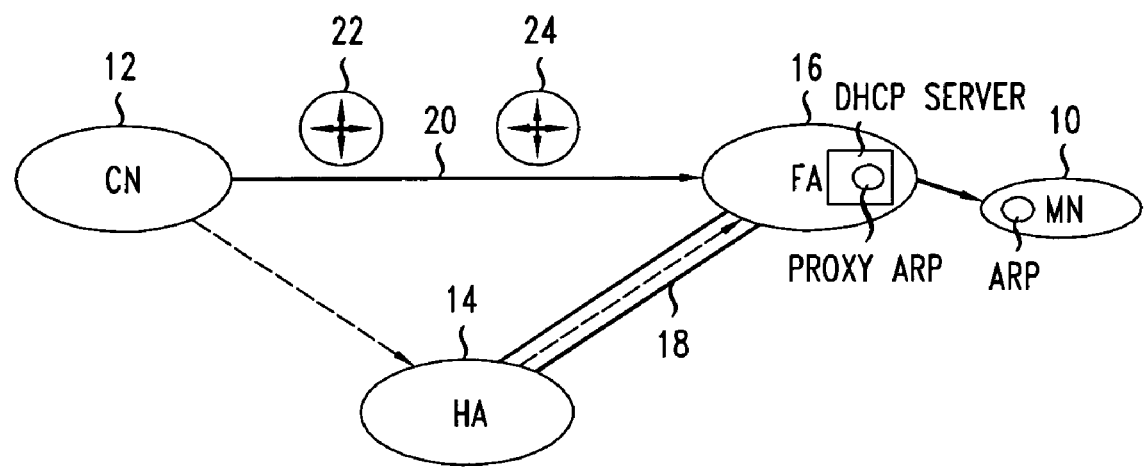

This application claims priority of European Patent Application No. 0020585.6, which was filed on 21 Aug. 2000.

BACKGROUND OF THE INVENTION

1. Field of the Invention

This invention relates to a method of supporting seamless hand-off in a mobile telecommunications network, especially to hand-offs to a roaming mobile terminal in the network.

2. Description of the Related Art

In third generation telecommunications networks such as GPRS (General Packet Radio Service) and EDGE (Enhanced Data-rate for GSM Evolution), when a mobile terminal moves into a foreign network, network connectivity is optionally maintained by the use of Mobile Internet Protocol (Mobile IP). In the home network, a Home Agent (HA) is set up which maintains the location information of the mobile by use of Binding Updates, i.e., registration of information sent to the HA by the mobile node.

Mobile IP has two working modes. The first is illustrated in FIG. 1; a mobile terminal is currently attached as a Mobile Node (MN) 10 in a network different from its home network. The MN 10 is communicating with a Correspondent Node (CN) 12. A Home Agent 14 is set up in the home network by the CN 12, and a Foreign Agent (FA) 16 is set up in the foreign network. The FA 16 allocates a unique IP address for the visiting mobile, a Care of Address (COA) and this address is sent to the HA 14 in a Binding Update.

Packets for the mobile are encapsulated by the HA 14 and tunneled along tunnel 18 to the FA 16 for transmission to MN 10. In such encapsulation, an extra IP header is added to each packet, including the COA of the MN 10. This is known as FA-COA working mode.

In the second working mode (not illustrated) there is no FA, the MN 10 is allocated a unique COA and encapsulated packets are tunneled by HA 14 directly to MN 10; this is known as Collocated Care of Address mode of working (CO-COA).

In a conventional packet switched network, when a host A sends a packet to another host B, host A needs to determine the Media Access Control (MAC) address of host B so that the packet can be delivered to the correct physical address in layer 2. Host A sends a MAC broadcast frame, called an Address Resolution Protocol (ARP) request frame, which contains the host A's IP and MAC addresses and the IP address of host B. All nodes in the local network receive the broadcast IP request frame, and compare the destination address with their own IP address. Only the node with the correct IP address of the ARP request responds by sending a ARP reply containing its MAC address. On receiving the ARP reply, host A updates its ARP cache, which usually times out periodically. After an ARP cache entry has timed out for a specific host, the ARP request is sent again to discover the MAC address of the destination. The ARP cache is consulted by a host before it sends an ARP request, and if the answer is found in the cache, the host does not need to generate an ARP request.

It is known to provide a proxy ARP which is an ARP reply sent by one node on behalf of another node which is unwilling or unable to answer its own ARP requests. The sender of a proxy ARP reverses the sender and target protocol address fields and supplies some configured MAC address (generally its own) in the sender hardware address field (the place-holder field). The node receiving the reply then associates this link-layer address with the IP address of the original target node, so that future packets for this target node are transmitted to that MAC address.

When a mobile roams it maintains connectivity by the use of a unique IP address allocated to it, a Care-of-Address, as explained above. By use of Mobile IP, a packet sent from a correspondent node to a mobile node can still use the home address of the mobile node no matter where the mobile moves to. The packet received in the foreign network needs to bear the current Care of Address of the mobile as the destination address. If applications running on the mobile node still use the home address of the mobile, there is seamless mobility support to those applications; the applications do not have to stop and re-start as the mobile roams.

However, before the packet can be sent from the last routing switch in the foreign network to the current Care of Address from the mobile, the routing switch needs to know the MAC address of the mobile. In the current functional specifications of ARP and of Mobile IP, this entry cannot be created. Referring again to FIG. 1, in the terms used above, either CN 12 or MN 10 can be host A, the other being host B. In either direction, packets passed through the network from router to router, and in FIG. 1 two routers 22, 24, are shown schematically adjacent the optimized route 20. Suppose packets are passing from CN 12 to FA 16 via routers 22, 24; before a packet can be sent from router 24 to the current Care of Address of MN 10, router 24 needs to know the MAC address of MN 10, as stated above.

The routers 22, 24 can alternatively be associated with the encapsulated route 18.

SUMMARY OF THE INVENTION

It is the object of the invention to provide a method of supporting seamless hand-off in a mobile telecommunications network of the type described above.

According to the invention, in a third generation mobile telecommunications network, a method of delivering packets in layer 2 to a mobile terminal in a foreign network comprises the steps of:
  providing an Address Resolution Protocol (ARP) entity;
  setting up a home agent in the home network; and
  allocating a Care of Address to the mobile node;
characterized by the further steps of:
  setting up a proxy ARP entity; and
  informing the proxy ARP entity of the Care of Address and the Media Access Control address of the mobile node.

DETAILED DESCRIPTION

In the invention, in addition to the proxy ARP entity, a Dynamic Host Configuration Protocol (DHCP) can also be used. The proxy ARP server can be built into the DHCP server, or it can be in a stand alone node. The proxy ARP is informed of the Care of Address and the MAC address of the MN 10; this can be achieved during the mobile node registration process; either the proxy ARP advertises itself and receives a registration reply from the MN 10, or the MN 10 solicits the proxy ARP by broadcasting a proxy ARP soliciting request, and the proxy ARP replies to confirm the registration.

The foreign network proxy ARP controls operations in two different cases, when there is transmission from CN 12 to MN 10, and when there is transmission in the opposite direction.

In the first case, transmission from CN 12 to MN 10, when the working mode is COCOA mode, when a packet from the CN 12 arrives at the last routing switch of the foreign network, i.e. switch 24, the switch broadcasts an ARP request, with the frame format:

| Sender's MAC | Sender's IP address | MN's MAC (NULL) | MN's COA |
| --- | --- | --- | --- |

The proxy ARP receives the broadcast message and compares the receiver's IP address with the registered Care-of-Address of the MN 10. If a match is found, the proxy ARP sends an ARP reply message having the format:

| MN's MAC | MN's COA | Sender's MAC | Sender's IP address |
| --- | --- | --- | --- |

When the switch 24 receives the ARP reply, it updates its ARP cache table by adding an entry with the unique mapping between the Care-of-Address and the MAC address of MN 10. The switch 24 can then successfully deliver the packet to MN 10 at the correct address in layer 2.

When the working mode is FA COA mode, the FA 16 replies to any request for its MAC address, sending the FA COA as the IP address of the mobile node.

In the second case, transmission from MN 10 to CN 12, there is a preliminary stage. Before a packet is sent by MN 10, the ARP module in MN 10 or the daemon running in MN 10 checks whether the destination of the packet (i.e. CN 12) is a node which is local to the home network of the MN 10. If the destination is in the home network, then the MN 10 broadcasts its ARP request using its own home IP address as the sender's address. The ARP request format is:

| MN's MAC | MN's Home IP Address | CN's MAC (NULL) | CN's IP Address |
| --- | --- | --- | --- |

When the proxy ARP receives the ARP request, it responds by sending an ARP reply message to the MN 10 in the format:

| FN Default Gateway's MAC | CN's IP Address | MN's MAC | MN's IP address |
| --- | --- | --- | --- |

Consider now the position when the destination is not in the home network of MN 10.

In the foreign network (FN) there is a Default Gateway; this Default Gateway broadcasts an ARP request message and the proxy ARP server learns the IP address of the foreign network Default Gateway by receiving this message. The MN 10 broadcasts an ARP request using the Default Gateway in the foreign network as the destination IP address. The ARP request format is:

| MN's MAC | MN's Home IP Address | FN's Default Gateway MAC(NULL) | FN's Default Gateway's IP address |
| --- | --- | --- | --- |

When the proxy ARP receives the broadcast, it sends an ARP reply message to the MN 10 in the format:

| FN Default Gateway's MAC | FN Default Gateway IP Address | MN's MAC | MN's Home IP Address |
| --- | --- | --- | --- |

The packet can therefore be successfully delivered to the CN 12.

In another variation, the ARP proxy can be built as a daemon running in the MN 10, care being taken that it does not affect the standard ARP daemon in the MN 10.

By application of the method according to the invention, seamless hand-off can be achieved even when a mobile is roaming in a foreign network.

We claim:

1. In a third generation mobile telecommunications network, a method of delivering packets in layer 2 to a mobile node in a foreign network comprises the steps of:
    providing an Address Resolution Protocol (ARP) entity;
    setting up a home agent in a home network of the mobile node;
    allocating a Care of Address to the mobile node; and setting up a Dynamic Host Configuration Protocol (DHCP);
    setting up a proxy ARP entity;
    informing the proxy ARP entity of the Care of Address and the Media Access Control address of the mobile node,in which packets are transmitted from a correspondent node to the mobile node and the Care of Address is a Collocated Care of Address comprising the further steps of:
    a last routing switch in the foreign network broadcasting an ARP request;
    the proxy ARP responding with an ARP reply message containing the MAC address of the mobile node;
    the last routing switch updating its ARP cache table by adding a unique mapping between the Care of Address and the MAC address of the mobile node; and
    the last routing switch delivering the packet to said MAC address.

2. A method according to claim 1 in which the ARP request from said last routing switch has the frame format:
    Sender's MAC; Sender's IP address; MN's MAC (NULL); MN's COA; and the ARP reply from the proxy ARP server has the frame format:
    MN's MAC; MN's COA; Sender's MAC; Sender's IP Address.

3. A method according to claim 1 in which packets are transmitted from the mobile node to a correspondent node comprising the further steps of the ARP entity checking whether the destination of the packets is a node in the home network of the mobile node, and if so, the mobile node sending an ARP request using its own home IP address as the sender's address; and the proxy ARP responding with a ARP reply addressed to the MN's IP address.

4. A method according to claim 3 in which the ARP request from the MN has the frame format:

MN's MAC; MN's Home IP Address; CN's MAC (NULL); CN's IP address; and the ARP reply from the proxy ARP server has the frame format:

FN Default Gateway's MAC; CN's IP Address; MN's MAC; MN's IP address.

5. A method according to claim 3 in which the destination of the packets is a node which is not in the home network of the mobile node, comprising the further steps of:

the mobile node sending an ARP request using the MAC address of a Default Gateway in the foreign network as the sender's address;

the Default Gateway receiving the ARP request and broadcasting it; and the proxy ARP responding by sending an ARP reply to the MN.

6. A method according to claim 5 in which the ARP request from the MN has the frame format:

MN's MAC; MN's Home IP Address; HN's Default Gateway (NULL); HN's Default Gateway's IP address;

and the ARP reply from the proxy ARP server has the frame format:

FN Default Gateway's MAC; HN Default Gateway's IP Address; MN's MAC; MN's Home IP Address.

7. In a third generation mobile telecommunications network, a method of delivery packets in layer 2 to a mobile node in a foreign network comprises the steps of:

providing an Address Resolution Protocol (ARP) entity;

setting up a home agent in a home network of the mobile node;

allocating a Care of Address to the mobile node; and setting up a Dynamic Host Configuration Protocol (DHCP);

setting up a proxy ARP entity; and informing the proxy ARP entity of the Care of Address and the Media Access Control address of the mobile node, in which packets are transmitted from the mobile node to the correspondent node comprising the further steps of the ARP entity checking whether the destination of the packets is a node in the home network of the mobile node, and if so, the mobile node sending an ARP request using its own home IP address as the sender's address; and the proxy ARP responding with a ARP reply addressed to the MN's IP address.

8. A method according to claim 7 in which the ARP request from the MN has the frame format:

MN's MAC; MN's Home IP Address; CN's MAC (NULL); CN's IP address; and the ARP reply from the proxy ARP server has the frame format:

FN Default Gateway's MAC; CN's IP Address; MN's MAC; MN's IP address.

9. A method according to claim 7 in which the destination of the packets is a node which is not in the home network of the mobile node, comprising the further steps of:

the mobile node sending an ARP request using the MAC address of a Default Gateway in the foreign network as the sender's address;

the Default Gateway receiving the APP request and broadcasting it; and the proxy APP responding by sending an APP reply to the MN.

10. A method according to claim 9 in which the ARP request from the MN has the frame format:

MN's MAC; MN's Home IP Address; HN's Default Gateway (NULL); HN's Default Gateway's IP address; and the ARP reply from the proxy ARP server has the frame format:

FN Default Gateway's MAC; HN Default Gateway's IP Address; MN's MAC; MN's Home IP Address.

* * * * *